United States Patent [19]
Mendelson et al.

[11] Patent Number: 5,996,060
[45] Date of Patent: Nov. 30, 1999

[54] SYSTEM AND METHOD FOR CONCURRENT PROCESSING

[75] Inventors: Avi Mendelson, Haifa; Freddy Gabbay, Tel-Aviv, both of Israel

[73] Assignee: Technion Research and Development Foundation Ltd., Park Gootwirt Haifa, Israel

[21] Appl. No.: 08/936,738

[22] Filed: Sep. 25, 1997

[51] Int. Cl.[6] .................................................. G06F 9/00
[52] U.S. Cl. ......................................................... 712/205
[58] Field of Search ....................... 364/DIG. 1, DIG. 2; 712/200, 203, 205, 206, 207, 208, 212, 214, 215, 216

[56] References Cited

U.S. PATENT DOCUMENTS

| | | | |
|---|---|---|---|
| 5,511,172 | 4/1996 | Kimura et al. | 712/235 |
| 5,553,255 | 9/1996 | Jain et al. | 712/235 |
| 5,751,983 | 5/1998 | Abramson et al. | 712/216 |

OTHER PUBLICATIONS

"Branch Prediction Strategies and Branch Target Buffer Design," Johnny K.F. Lee, Hewlett Packard Alan J. Smith, University of California, Berkeley, 1984.

"Adaptive Training Branch Prediction," Tse–Yu, Yale N. Patt Dept. of Electrical Engineering and Computer Science Univ. of Michigan, Ann Arbor Michigan, undated.

"Performance Evaluation of the PowerPC 620 Microarchitecture," Trung A. Diep, Chistopher Nelson and John Paul Shen, Dept. of Electrical and Computer Eng. Carnegie Mellon Univ, 1995.

"The Major Hurdle of Pipelining–Pipeline Hazards" (Chapter 6.4) 1990 (Computer Architecture) David A. Patterson John L. Hennessey.

"An Introduction to Superscalar Concepts", No Author, Undated.

"Value Locality and Load Value Prediction" (Proceedings of ASPLOS) 1996 Mikko H. Lipasti, Christopher B. Wilkerson and John Paul Shen Dept. of Electrical and Computer Engineering.

*Primary Examiner*—Robert B. Harrell
*Attorney, Agent, or Firm*—Browdy and Neimark

[57] ABSTRACT

A processor and associated memory device that includes a fetcher for fetching instructions stored in the memory device. Each instruction constitutes either a value generating instruction or a non-value generating instruction. The processor further including a decoder for decoding the instructions, an issue unit for routing decoded instructions to an execution unit. The processor further having a predictor being responsive to a first set of instructions, from among the value generating instructions, for predicting, with respect to each one instruction in said first set of instructions, a predicted value that is determined on the basis of a prediction criterion which includes: (i) a previous value generated by the instruction; and (ii) at a stride.

23 Claims, 13 Drawing Sheets

SYSTEM AND METHOD FOR CONCURRENT PROCESSING

FIELD OF THE INVENTION

The present invention is in the field of concurrent execution and parallel processing of the kind in processors that employ multi-execution units and as well as in multi-processor system.

BACKGROUND OF THE INVENTION

Current processors technology allows different execution units (pipes) to operate in parallel. As the number of gates on silicon chip increases, a major problem that processor architecture meets is the limited parallelism within the instruction stream. Such parallelism is limited because of data dependencies as well as because of control dependencies.

For a better understanding of the terms data dependency and control dependency consider, for example, the following exemplary computer program segment that performs a certain computation on non-overlapping arrays of variables:

```
loop:  A[j + 1]: = A[j] + j
       B[j]: = 4*B[j]
       j: = j + 1
       i: = 1 + j
       while (j! = 1000) go to loop
       k: = k + 1
       ...
```

From the processor point of view, the program can be illustrated as a stream of instructions (Architectural instructions or micro machine instructions) that can be divided into three main categories: (1) arithmetic instructions that aims to modify values existing in the processor's storage areas, such as registers, (2) control instructions that aims to determine what instruction out of the program's area will be execute next and (3) load store instructions that aims to move data from and to the process's local memory area (such as registers) and the memory. The goal of ALL the modern processors is to perform as many operations as possible in parallel, while keeping the correctness of the execution; i.e., the user should not distinguish between a program running on such a parallel machine and the same program running on machine that performs the operation sequentially.

Modern processors analyze the streams of instructions the processor should execute and determine which operations the processor can perform in parallel. To this end, the processor needs to examine for each operation whether all of the inputs needs for the operation are available at that time. Input may not be available for different reasons such as the value has not be calculated (by another instruction) or the fetching process of the data into the processor's area have not been completed yet. All the operations that have been found to be ready can be executed in parallel (See Mike Johnson, Design of Superscalar Processor). The average number of operations the processor, or a system can execute in parallel is termed Instruction Level Parallelism—ILP. As for the above simple example, intuitively, the instruction B[j]:=4*B[j] albeit placed after the instruction A[j+1]:=A[j]+j in the source code, both instructions can be marked "ready" at the same time, since the outcome of the latter (i.e. modifying the value of certain cell in the array 'A') does not affect the former (i.e. modifying the value of certain cell in array 'B'). Thus, the processor can execute them in parallel. In other words, the latter scenario illustrated the lack of data dependency.

Conversely, the processor must execute the instructions j:=j+1 and i:=1+j exactly in the order they appear (in respect to each other) since the value of j, as determined in the former instruction, affects the value of i in the latter instruction. Put differently, the latter scenario illustrates data dependency. As will be explained in greater detail below, data dependencies are divided into three main categories, i.e. output data dependency, anti data dependency and true data dependency (Superscalar Microprocessor Design, Mike Johnson, Book).

In order to take advantage of independent operations and in order to speed up the execution rate, current processor technology integrates the mechanisms to exploit parallelism within the multi-stage (pipeline) architecture, as illustrated e.g. in FIG. 1.

In the example of FIG. 1, several instructions are fetched in parallel into an instruction buffer (in the fetch stage), then they are decoded, the dependencies are explored and the instructions are placed in a buffer termed reorder buffer. The issue stage sends the instructions which are ready to the execution stage; i.e., their input data is available and they do not depend on outcome of other operation(s), and so, independent instructions can be executed in parallel. The outcome of the execution can update register(s), memory location(s), hardware flag(s), the program counter and/or operations on the reorder buffer to make instructions which are marked as stalled to be moved into ready to be executed state.

The amount of parallelism exists in the execution stream, depends on the size of the instruction window; i.e., the number of instructions that are classified by the system as ready to be executed. Control instruction and hardware complexity limits the size of the instruction window significantly. It was reported (Hennessy and Patterson: Computer architecture: a quantitative approach) that as many as 20% of the instruction the processor executes can be control instruction, bringing the average size of the instruction window available between control instructions to 4 instructions. It is clear that without enlarging the size of that window, the amount of parallelism the architecture can benefit from is very limited. Control instructions usually appears as different types of conditional or non-conditional branch instructions. (For simplicity, conditional or non-conditional branch instructions will also be referred to, in short, branch or control instructions). An example of conditional branch being: "while (j!=1000) go to loop". Conditional branch instruction includes, as a rule, a logical condition and a destination address. When the condition is met, the next instruction for execution resides in dostination. If, on the other hand, the condition is not met, the next instruction for execution follows the branch instruction (some architecture such as VAX™ introduced more sophisticated branch instructions that uses tables of addresses to control the instruction flow, but this instructions has the same nature from the perspective of the present invention.) When executing a sequential set of instructions that does not include branch instructions, the issue of control dependency is irrelevant since the address of the next instruction to be executed can be unequivocally resolved. In contrast, the next instruction for execution cannot be unequivocally predicted if branches are encountered, since at the prediction stage the processor has not resolved the logical condition and the target address calculation that is associated with the branch instruction and accordingly it is unclear whether jump occurs, (in which case the next address for execution resides at the destination address of the branch), or alternatively the condition is not met (in which case the next instruction to execution is the one that follows the conditional branch instruction).

Bearing this in mind, branches (control instructions) can significantly reduce the amount of parallelism the processor can utilize (J. Lee and A. J. Smith. Branch Prediction Strategies and Branch Target Buffer Design. IEEE Computer, January 1984, pp. 6–22. and T.-Y. Yeh and Y. N. Patt. Adaptive Training Branch Prediction. The 24$^{th}$ ACM/IEEE International Symposium and Workshop on Microarchitecture). When the branch instruction is evaluated in decode stage, the decode stage and the fetch stage cannot continue their operation until the branch conditions are resolved and the address of next instruction to be fetched and decoded is calculated.

This drawback is clearly illustrated in the specified exemplary computer program segment. Thus, encountering the "if" statement (i.e. conditional branch) hinders the possibility of keeping on revealing independencies among the instructions, in the manner specified, since it is not known at this stage (which, as recalled, precedes the actual execution) whether the next instruction is A[j+1]:=A[j]+j (i.e. the condition of the "if" clause has been met), or k:=k+1 (i.e. the condition of the jump has not been met). Of course, the condition will be resolved at run time, but relying on this misses the whole point of prediction in-advance (i.e. before actual execution) which instructions are independent, one with respect to the other, so as to route them, in due course, to separate execution units thereby accomplishing parallel processing.

To cope with the problem of conditional branches, various branch predictors were suggested; e.g., when the decoder hits a branch, it predicts the outcome and continue to decode the operands based on this assumption. The instructions that were decoded based on this prediction are marked as speculative. As soon as the branch can be resolved (calculate its condition and the target address), all the speculative instructions belonging to that decision are either validated (in case of successful prediction) or be discarded (in case of failure) from the system. This mechanism was found to be very effective and so is used by many of the existing processors (T. A. Diep and C. Nelson and J. P. Shen Performance Evaluation of the PowerPc 620 Micro architecture. The 22$^{nd}$ Annual Symposium on Computer architecture, 1995, pp 163–174. [Diep95]).

Branch predictors of the kind specified whilst increasing the level of parallelism (ILP) to a certain extent, are not always successful in their prediction in which case the instruction level parallelism (ILP) is, of course, detracted since all the speculative instructions that followed the mispredicted branch instruction must be discarded.

The ILP accomplished by virtue of the branch predictors does not accommodate the ever increasing capacity of modern processors in terms of their capability to concurrently process instructions.

In this connection it should be noted that the trend in modern processors is to employ more and more execution units, which of course calls for enhancement of the ILP in order "to keep them all busy" and thereby expediting the processing time of the executed application. An example of this trend is manifested by the increase in number of execution units that is employed in the known PowerPC® 601 model (three units) compared to the succeeding generation PowerPC® 620 which already employs 6 execution units.

The necessity for increased parallelism further stems from the use of known pipelining techniques which affords overlapping of multiple instructions even when one execution unit is utilized and apportions when multiple execution units are utilized. A detailed discussion of the pipelining concept can be found, e.g. in: David A. Patterson and John L. Hennessy, "Computer Architecture: A quantitative approach", Morgan Kaufmann Publishers Inc., Section 6.1 (1990).

Having described the improvement in ILP accomplished by coping with control dependency, the herein below description focused on other hitherto known techniques for further enhancing ILP by coping with the so called anti-data dependency and output data dependency (referred to also as write-after-read conflict and write-after-write conflict, respectively). It should be noted that in the context of the invention, "write-instruction" and/or "read instruction" should be construed as forming part of write-after-write, read-after-write or write-after-read conflicting instructions. For a better understanding of the foregoing, attention is directed to the following exemplary computer program segment written in pseudo-assembly language:

| ADD | R1, R2, R3 |
| ADD | R4, R7, R1 |
| ADD | R1, R7, R2 |

The first instruction sums the contents of registers R2 and R3 and stores the result in register R1. Likewise, the second and third instructions realize the arithmetic operations R4=R7+R1 and R1=R7+R2 respectively.

Whilst, ideally, it would be desirable to route the three specified instructions to three separate execution units, respectively, so as to attain maximal ILP, it is readily seen that the first and second instruction constitute true data dependency (referred to also as read-after-write conflict) since the input operand R1 of the second instruction (the read instruction), can be set only after the termination of the execution of the first instruction (the write instruction), i.e. R1 holds the value of R2+R3. Accordingly, the first and second instructions should be executed serially. The first and the third instructions exemplify the output data dependency (or write-after-write conflict). Write-after-write conflict always involves instructions write to the same location. By this particular example it is not possible to execute the first and third instructions simultaneously (and only afterwards the second instruction), since the second instruction requires as an input R1=R2+R3. Had the first and third instructions been executed simultaneously and assuming that the third execution unit is slower (in only fraction of a second), it would have result in R1 holding the value of R2+R3 upon the termination of the first execution unit, and immediately afterwards (i.e. when the third execution unit terminates its calculation) the latter value of R1 is overwritten by a new value (i.e. R1 holds the value of R7+R2). Now the execution of second instruction is erroneous since the input operand R1 holds a wrong value (i.e. R7+R2 rather than R2+R3).

The write-after-write conflict is easily resolved, e.g. by employing a so called register renaming technique (Superscalar Microprocessor Design, Mike Johnson, Book). Thus, for example, the register R1 of the third instruction is assigned to a virtual register R' (which may practically be a free physical register $R_n$). Now, the first and the third instruction may be executed simultaneously and upon termination of the first instruction, the second instruction is executed.

By following this approach, the input operand R1 of the second instruction stores the correct value of R2+R3 whereas the result of the third instruction is temporarily stored in R' ($R_n$). All that remains to be done is to move the contents of register R' to R1 so as to duly realize the third instruction.

A similar approach is used with respect to the so called "anti-data" dependency and a detailed discussion of the anti-data and output-data dependencies as well as the possible solutions to cope with this phenomenon can be found in (Superscalar Microprocessor Design, Mike Johnson, Book).

All the hitherto known techniques do not address the problem of true data dependency as explained above, and albeit they improve the ILP, this does not bring about sufficient utilization of the multiple execution units employed by present and future processors.

Mikko H. Lipasti, Christopher B. Wilkerson and John Paul Shen in their publication (*Value Locality and Load Value Prediction, Proceeding of the PACT Conference* 1996) have introduced a new technique which purports to address to a certain extent, the problem of true data dependency.

The proposed technique attempts to overcome the inherent delay in a program's execution that occurs when encountering a "load" instruction. Normally, a load instruction loads an operand from a source address into a destination register. If the source address is located in a memory other than the fast cache or physical register, a relatively long number of processor cycles (hereinafter wait cycles) are required for fetching the operand from the source address. (The same applies, of course, to the destination address.)

Consider, for example, the following two instructions in pseudo-assembly language:

LOAD R1, source
ADD R3, R2, R1

As shown, after loading the content of the "source" address into register R1 it is added to R2 and stored in register R3. Obviously, the execution of the second instruction (ADD) can commence only upon the termination of the first instruction, thereby constituting true data dependency.

Since, as specified before the load instruction may require a few wait cycles until the input operand is fetched, this necessarily leads to slowing down the execution time of the entire program due to the constraint to commence the execution of the ADD instruction only upon the termination of the load instruction. This is particularly relevant when bearing in mind that a typical computer program includes few and occasionally many load instructions.

Having explained the normal operation of load instruction in the context of true data dependency, there now be explained the proposed improvement of the Mikko H. Lipasti, Christopher B. Wilkerson and John Paul Shen which introduces ILP in read-after-write conflict in the specific case of load instruction. The proposed improvement is based on the fundamental premise that the value of a source operand fetched from a source address has not changed since the previous access to the same individual load instruction. Applying this approach to the previous exemplary instructions results in that after executing the "load" instruction for the first time (which as recalled may require few processor wait cycles) the value stored in the source address is copied to a readily accessible data structure, (i.e. an indexed but not tagged hash table). Now, when the same instruction is encountered for the second time, the readily accessible data structure is accessed and the value is retrieved therefrom and may be stored immediately at the input operand of the second instruction (ADD) before the actual value is fetched from the source address. This scenario enable to expedite the execution of the program since the second instruction (ADD) is executed before the first instruction (load) has been terminated.

All that remains to be done is to commit afterwards the result of the second instruction, similar as to the verification process of the branch prediction i.e. to ascertain that the predicted value (as retrieved from the readily accessible data structure) matches the value as actually retrieved from the source address. If in the affirmative, the second instruction is committed and a certain level of parallelism has been accomplished. If on the other hand, the values do not match the results of the second instruction has to be discarded and the instruction must be executed again. The latter case of mis-prediction involves a penalty of a single clock cycle.

The proposed "expedite load" technique resembles to a certain extent the hitherto known "forward" technique for enhancing execution. As is well known to those versed in the art, "forwarding" is a technique that is normally used in the case that the output of a given instruction is used as an input of a succeeding instruction (i.e. read-after-write conflict). In the latter case the forwarding technique affords to skip conventional "house cleaning" stages, that are normally executed upon termination of the execution of an instruction, by "injecting" the result to the waiting operand of the succeeding instruction (the read instruction), immediately upon the production thereof at the output of the execution unit, thereby expiating the processor performance.

The proposed "load expedite" purports to offer a solution for true data dependency prediction only in the context of load instructions, accordingly the accomplished ILP is indeed limited. As reported, the improvement of only 3–9% is obtained when the "load expedite" method is implemented in Power Pc 620™ and Alpha 21064™.

It should be noted that several other hitherto known per se technologies are capable of addressing the same problem whilst accomplishing comparable results such as data pre-fetching and write-cache techniques. In so far as practical realization of the proposed "load expedite" technique is concerned, it should be noted that in order to benefit from executing multiple mutually dependent load instructions at the same time, multiple load/store units are required to access the memory system, and possibly to carry out parallel verification procedures. However, utilizing multiple load/store units poses undue cost to current and future processor technology in terms of overly large die space and increased power dissipation.

It is accordingly a general object of the object of the present invention to further enhance ILP and in particular to offer, an enhanced technique to cope with read-after-write instruction conflict (or true data dependencies).

SUMMARY OF THE INVENTION

There is thus provided in accordance with a first aspect of the invention, a processor and associated memory device comprising a fetcher for fetching instructions stored in said memory device; each instruction constitutes either a value generating instruction or a non-value generating instruction; each one of said value generating instructions having at least one destination for storing said value;

the processor further comprising a decoder for decoding said instructions, an issue unit for routing decoded instructions to at least one execution unit;

the processor is characterized in further having a predictor being responsive to a first set of instructions, from among said value generating instructions, for predicting, with respect to each one instruction in said first set of instructions, a predicted value that is determined on the basis of a prediction criterion which includes; (i) at least one previous value generated by said one instruction; and (ii) at least one stride;

said issue unit being further capable of detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

said issue unit is capable of assigning the predicted value of said write instruction to the at least one operand of said read instructions thereby rendering the latter speculative instructions, and is further capable of routing said write and at least one of said read instructions to distinct execution units, from among said at least two execution units, so as to accomplish parallel processing; and commit unit for committing at least said speculative instructions.

The invention further provides, in a processor and associated memory device, a method for accomplishing parallel processing, comprising:

(i) fetching instructions stored in said memory device; each instruction constitutes either a value generating instruction or a non-value generating instruction; each one of said value generating instructions having at least one destination for storing said value;

(ii) decoding said instructions;

(iii) routing decoded instructions to at least one execution unit;

(iv) predicting with respect to each one instruction in a first set of instructions, from among said value generating instructions, a predicted value that is determined on the basis of a prediction criterion which includes: (i) at least one previous value generated by said one instruction; and (ii) at least one stride;

(v) detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

(vi) assigning the predicted value of said write instruction to the at least one operand of said read instructions thereby rendering the latter speculative instructions;

(vii) routing said write and at least one of said read instructions to distinct execution units, from among said at least two execution units, so as to accomplish parallel processing; and (viii) committing at least said speculative instructions.

Value generating instructions, in the context of the invention, are those which affect the contents of at least one destination (where destination stands for a memory location and/or register).

Typical, yet not exclusive examples, of the latter instructions being move, (memory/register) load/store, the various calculation instructions such as add, subtract, multiply, divide, shift etc for integers and/or floating point numbers. In contrast, non-value generating instructions are those which do not affect memory locations or registers, except for the so called "flag register" or "program counter" (the latter holds the address of the next instruction for execution). Typical, yet not exclusive, examples of non-value generating instruction being unconditional jump instruction, the various conditional jump instructions as well as the various compare instructions.

The nature and type of value generating instructions depend, of course, on the architecture and the instruction set of the specific processor under consideration.

It should be noted that in a given processor having a given set of value generating instructions, said predictor being responsive to the specified first set of value generating instructions where the latter being some or alternatively the entire set of said given value generating instructions. Thus, for example, said first set of value generating instructions may be only the calculation instructions or even restricted to part or all of the Arithmetic Logic Unit (ALU) calculating instructions (being a sub-set of said calculation instructions that apply solely to integer numbers), part or all of the Floating Point Unit (FPU) calculating instructions (being a sub-set of said calculation instructions that apply solely to floating point numbers) and others, all as required and appropriate depending upon the particular application. Said second set of instructions may be any sub set of or the entire first set of instructions. Put differently, if desired, the issue unit may deal with only some of the write instructions that were subjected to prediction. The third set of instruction which encompass the specified read instruction may be any desired such set or the entire set of instructions supported by said processor. By way of specific non limiting example the second and third sets being the same, e.g. ADD and MUL instructions.

It should be noted that a different prediction criterion may be applied to different instructions, e.g. as will be shown below, a different criterion is used for integer and floating point instructions.

As will be explained in greater detail below, normally, in the commit stage, each one of the speculative instructions by either verifying it (and possibly other instructions that depend upon said speculative instruction) and updates the predictor, or refuting the speculative instruction (and possibly other instructions that depend upon said speculative instruction). Depending upon the particular application, other actions may form part of the committing stage, all as required and appropriate.

It should be further noted that the nomenclature "previous value" does not necessarily signify last value and like wise "followed by" should not be limited to immediately followed. In other words instruction C follows instruction A also in the case that instruction B is placed between A and C.

One of the important findings of one aspect of the invention is the basing of the predicted value on at least one previous value and at least one stride. This approach enables to significantly extend the list of instructions that are susceptible to prediction up to a maximum of the entire set of value generating instructions, The invention is not limited to any particular technique for determining the stride and the previous value and a typical yet not exclusive example that utilizes one previous value and one stride value will be described below.

For a better understanding of the foregoing consider, for example, the instruction "ADD memory, R2, R1" (i.e. R1+R2 is stored in the memory location "memory"). Suppose that whenever this instruction is encountered the difference between the previous and current value of "memory" is 4, (the value of stride is therefore 4). This means that when this instruction is encountered next time, it is possible to predict the value of "memory" (i.e. previous memory+4) before the instruction is actually executed.

Now, if there exists a consecutive instruction e.g. "SUB R7, R6 "memory" (i.e. R7=memory−R6), the constraint of executing these instructions serially is removed, and they can be executed simultaneously (i.e. in two distinct execution units) by assigning to the input operand "memory" of the SUB instruction, the predicted value of the "ADD" instruction.

Of course, as in the branch prediction, an additional commit stage is required in order to verify that there is no discrepancy between the predicted value of the ADD instruction and the actual value thereof after execution. If discrepancy is found, all the speculative instructions (i.e. those which are based on the predicted value, and in this particular example the "SUB" instruction) are discarded or in other words have to be re-executed.

The use of at least one previous value and at least one stride (and possibly other addition criteria) enables to predict the value of many instructions thereby to significantly increase parallelism and to better utilize the available execution units.

The predictor may be fed with fetched instructions (i.e. before they are decoded) and the resulting predicted values are utilized by said issue unit. This however is not obligatory, and by another, non-limiting example, the predictor is fed with decoded instructions (i.e. decoded value generating instructions). In this connection it is recalled that regardless of which instructions it is fed with, the predictor is responsive only to said first set of instructions.

If desired the predictor may be further adapted to deal with other known per se write-after-write and write-after-read conflicting instructions, e.g. by employing register renaming and other known per se techniques, all for the purpose of further enhancing the ILP of the processor. Also if desired the predictor may be further adapted to deal with branch dependencies.

By another aspect of the invention, the invention further provides for a processor and associated memory device comprising a fetcher for fetching instructions stored in said memory device; each instruction constitutes either a value generating instruction or a non-value generating instruction; each one of said value generating instructions having at least one destination for storing said value; said value generating instructions include calculating instructions;

the processor further comprising a decoder for decoding said instructions, an issue unit for routing decoded instructions to at least one execution unit;

the processor is characterized in further having a predictor being responsive to a first set of instructions, from among said calculating instructions, for predicting, with respect to each one instruction in said first set of instructions, a predicted value that is determined on the basis of a prediction criterion which includes: (i) at least one previous value generated by said one instruction;

said issue unit being further capable of detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

said issue unit is capable of assigning the predicted value of said write instruction to the at least one operand of said read instructions thereby rendering the latter speculative instructions, and is further capable of routing said write and at least one of said read instructions to distinct execution units, from among said at least two execution units, so as to accomplish parallel processing; and commit unit for committing at least said speculative instructions.

Still further the invention provides for, in a processor and associated memory device, a method for accomplishing parallel processing, comprising:

(i) fetching instructions stored in said memory device; each instruction constitutes either a value generating instruction or a non-value generating instruction; each one of said value generating instructions having at least one destination for storing said value; said value generating instructions include calculating instructions;

(ii) decoding said instructions;

(iii) routing decoded instructions to at least one execution unit;

(iv) predicting with respect to each one instruction in a first set of instructions, from among said calculating instructions, a predicted value that is determined on the basis of a prediction criterion which includes: (i) at least one previous value generated by said one instruction;

(v) detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

(vi) assigning the predicted value of said write instruction to the at least one operand of said read instructions thereby rendering the latter speculative instructions, (vii) routing said write and at least one of said read instructions to distinct execution units, from among said at least two execution units, so as to accomplish parallel processing; and (viii) committing at least said speculative instructions.

The latter aspect focuses on the calculating instructions which inherently are executed by execution units other than load/store units, and aims at increasing the efficiency of the available execution unit by evaluating some or all of the instructions destined thereto in order to predict their values in advance and thereby affording parallel execution in the case of revealed read-after-write conflict. According to specific implementation of the latter embodiment, a simplified prediction criterion (as compared to that described above) is utilized, i.e. relying solely on at least one previous value.

The various comments specified above with respect to the first aspect of the invention, apply mutatis mutandis also to the second aspect of the invention.

It should be noted, generally, that steps specified in the methods claims are not necessarily executed in the order that they appear, all as required and appropriate, depending upon the particular application.

BRIEF DESCRIPTION OF THE DRAWINGS

For a better understanding the invention will now be described, by way of example only, with reference to the accompanying drawings, in which.

DESCRIPTION OF SPECIFIC EMBODIMENTS

It should be noted that the herein-below reference to particular processor architectures or specific computational stages is made by way of example only and, accordingly, the present invention is by no means limited to these architectures or computational stages.

Figure 1:
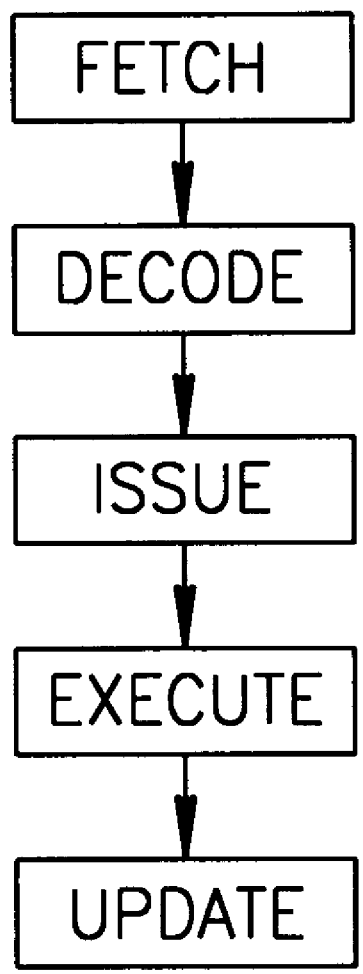
FIG. 1 is a generalized block diagram of the main stages in a typical processor pipeline architecture.

Bearing this in mind, attention is first directed to FIG. 1 showing a generalized block diagram of the main stages in a typical processor pipeline architecture. FIG. 1 was referred to when explaining conventional pipeline techniques in the "background of the invention" section above.

Figure 2:
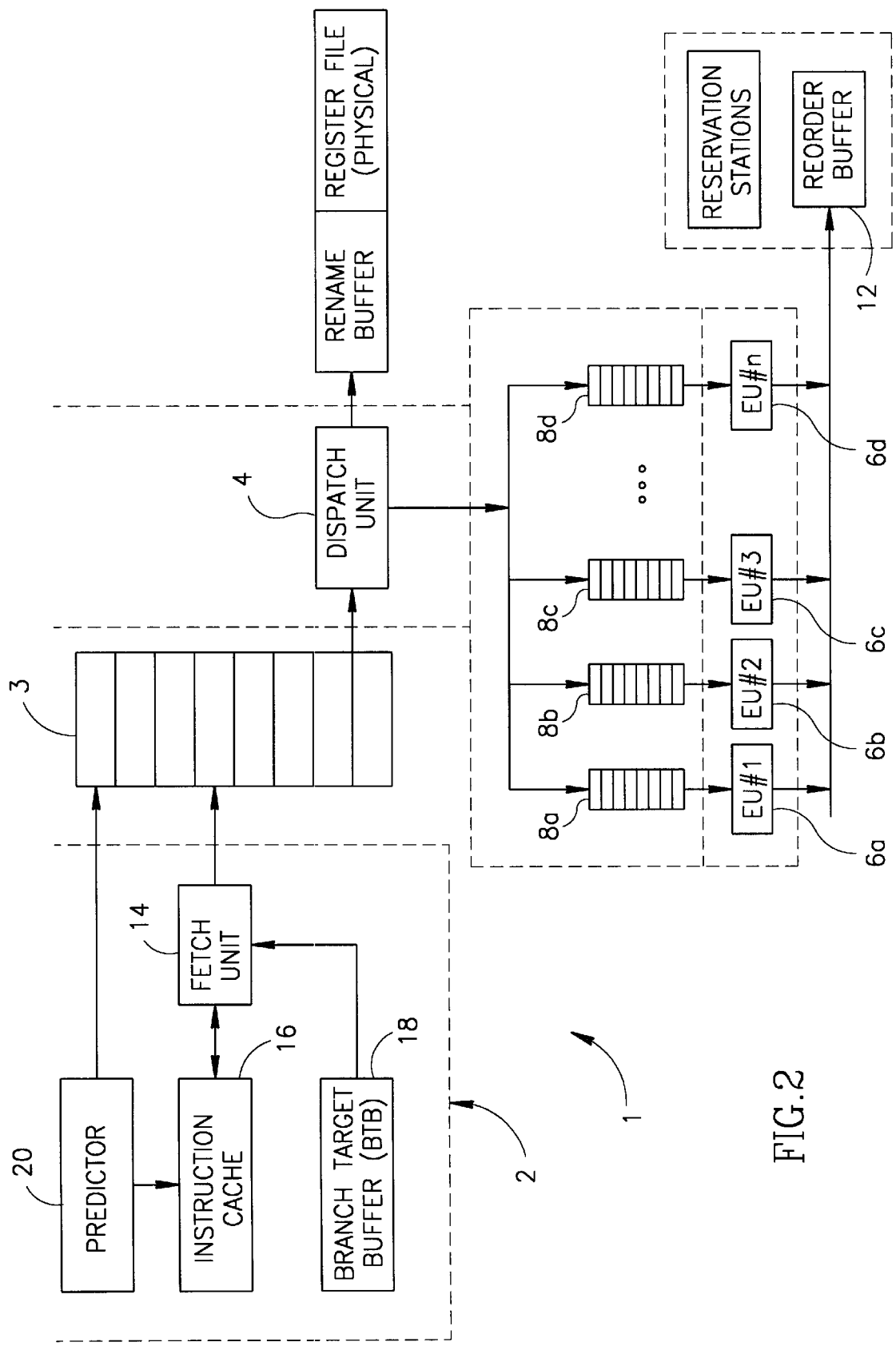
FIG. 2 is a generalized block diagram of a processor employing multi-execution units.

Attention is now directed to FIG. 2 showing a generalized block diagram of a typical, yet not executive, processor employing out-of-order, multi-execution units, arranged in a pipeline architecture. Thus processor 1 includes a fetcher module 2 coupled to instruction buffer 3 which in turn is coupled to a dispatcher unit 4. The latter communicated with plurality of execution units $EU_{\#1}$ to $EU_{\#n}$ (of which only four 6a–6d are shown, by the intermediary of respective buffers 8a to 8d.) The execution units are coupled by means of result bus 10 to reorder buffer 12.

The fetcher 2 includes a fetcher unit 14 communicating with instruction cache memory 16 for fetching instructions and associated operands stored therein. Normally, the cache memory is associated with other main memory modules and possibly also with external memory (not shown) and governed by memory management utilities of an operating system, all as known per-se.

As shown, the fetcher of FIG. 2 is also associated with a Branch Target Buffer (BTB) module 18 and with the reorder buffer. The BTB, which, as described above, is capable of performing branch prediction in a known per se manner. The reorder buffer, aims to guarantee the correct architecturally order of execution; i.e., that from an external point of view, (from the perspective of the user) the result would be committed in the same manner as if it were performed on a processor that executes all the operations in sequential order. The fetcher unit accesses the instruction cache 16, for fetching several instructions per cycle which are temporarily stored in buffer 3. The instructions in the latter are fetched by the dispatcher unit 4 which functions effectively both as a decoder and as an issue unit, Thus, dispatcher unit 4 carries out, in a known per se manner, the following tasks:

(1) decoding the instructions that are taken from buffer 3
   (2) Opening a corresponding entry in the re-order buffer for each instruction (entries are arranged in-order).
   (3) For each decoded instruction, checking whether the input operand(s) thereof is(are) ready and if in the affirmative the instruction is ready for executions; for each issued instruction, opening a respective entry in selected reservation buffer from among buffers 8a–8d.
   (4) for non-ready-to-execute instructions, i.e. those which has at least one non ready source operand, the dispatcher will commence a "watch procedure" in order to readily detect the sought operand once it is ready. Some processors use a special mechanism, known per se forwarding means (not shown in FIG. 2) feed the output of one operation to the input of the operation that uses it.

As is well known, if a branch instruction is encountered, the BTB attempts to predict the correct control path, and this may result in that some of the fetched instructions are rendered useless, i.e. if a branch was proven to occur, the instruction(s) that follows the branch instruction that had already been brought to the processor are, of course, no longer required. Thus, they should be ignored.

Turning now to the reservation buffer (8a–8d), each holds the instructions that are destined to its respective execution unit. According to the architecture of FIG. 2, instruction may be placed in the reservation buffer even if one or more of its source operands is not ready. To this end, each instruction in the reservation buffer is associated with a suitable tag which signifies whether or not it is ready for execution. The latter stipulation necessarily entails that instruction stores in the reservation buffer may be executed out-of-order, i.e. if a given instruction is first in the queue of the reservation buffer, but it is not ready, as yet, for execution, the succeeding instruction that is ready for execution is taken from the queue and fed to the execution unit.

Normally, an instruction is fed to the execution unit (i.e. "ready") when all its source operand(s) is(are) ready and the instruction is loaded to the execution unit once the latter is free. For those instructions which are placed in the reservation buffer despite being not ready, the dispatcher will update their operand(s) once they are available and duly mark the instructions as ready.

The execution units described in FIG. 2 are not necessarily of the same type, e.g. ld/st (load store), ALU (arithmetic logic unit), FP (floating point), Branch evaluation, etc. Execution units of value generating instructions are usually adapted to receive instruction along with its source operand (s) (if exist) and generate a result that is injected to the result bus 10.

As specified above, for each instruction that is fed to the dispatcher 4, a corresponding entry is opened at the reorder buffer 12. Accordingly, instructions that are fed in an out-of-order manner to the various EUs (execution units) have nevertheless corresponding in-order entries in the reorder buffer. The relevant entry in the reorder buffer is updated either as a result of the completion of the load operation (in the load/store EU) that bring the operand it waited for, or with the result as injected to the result bus 10 upon the termination of the execution of its corresponding instruction in an other type of EU.

As is well known, in order to keep the correctness of the execution it is required to restore, eventually, the order of the instructions exactly as appearing in the program for execution, (i.e. in the order they were fetched by the fetcher) so that, if a wrong branch prediction was made or if an exception occurs, the processor should ignore all the out of order operations that were exceeded that point in the program. In addition the recorder buffer guarantees that the committed computation are written in-order to the architectural registers. All that remains to be done is to "commit" or "discard" the instructions that are accumulated in the reorder buffer 12 because of various reasons some of which specified above, e.g. (i) the mis-prediction of a branch instruction which results in discarding all the speculative instructions that were assumed to be executed after the mis-predicted branch; (ii) in the case that the processors has renamed registers of certain instruction, the renamed registers should be restored to their original architectural registers, all as known per se.

An even more detailed description of the processor's architecture of FIG. 2 can be found in (T. A. Diep and C. Nelson and J. P. Shen Performance Evaluation of the PowerPc 620 Micro architecture [Diep95] and Mike Johnson, Superscalar processor design.) Those versed in the art will readily appreciate that the above description with reference to processor 1, refers to one out of many possible variants of pipelined, multi-EU, processors' architectures.

FIG. 2 further includes predictor unit 20 coupled to a fetcher unit 14, which forms part of the invention and the operation thereof will be described in greater detail below.

According to the invention, a new type of speculative execution that can be used either instead of the "traditional" branch predictors or in addition to these mechanisms is offered. Thus, it is proposed to enlarge the amount of instruction level parallelism by predicting the values of different data items, such as the values of memory locations, registers etc. (i.e. the destination of value generating instructions.)

In order to clarify the underlying idea of the invention, reference is made to the previous exemplary computer program segment:

```
loop:   A[j + 1]: = A[j] + j
        B[j]: = 4*B[j]
        j: = j + 1
        i = 1 + j
        while (j! = 1000) goto loop
        ...
```

As recalled, A and B are no-overlapping arrays of variables. Let j and i be integer variables assumed to have an initial value 0.

Figure 3:
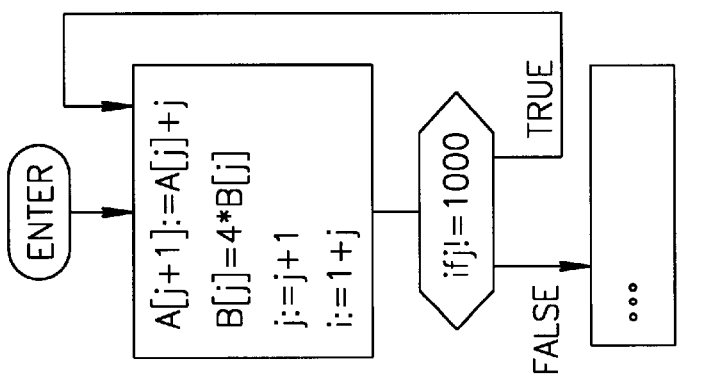
FIG. 3 is all illustration of an exemplary computer program segment represented as a control flow graph.

The control flow graph that is obtained out of the above program segment is illustrated in FIG. 3. The graph consists of a basic block that ends with a control instruction that determines the next control flow.

Figure 4A:
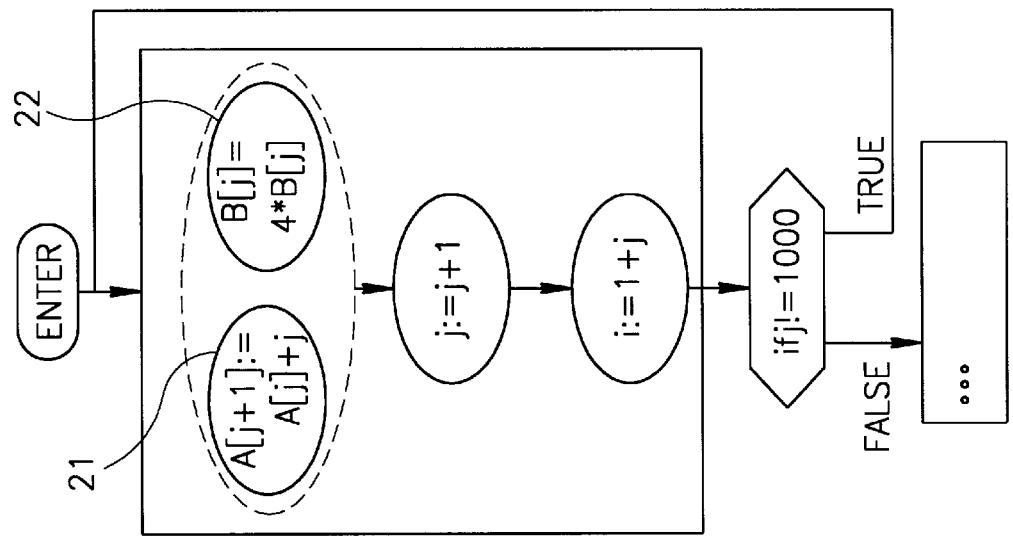
FIGS. 4A–B are two illustrations of the exemplary computer program segment of FIG. 3, represented as a combined control and data flow graph, according to the prior art.
Figure 4B:
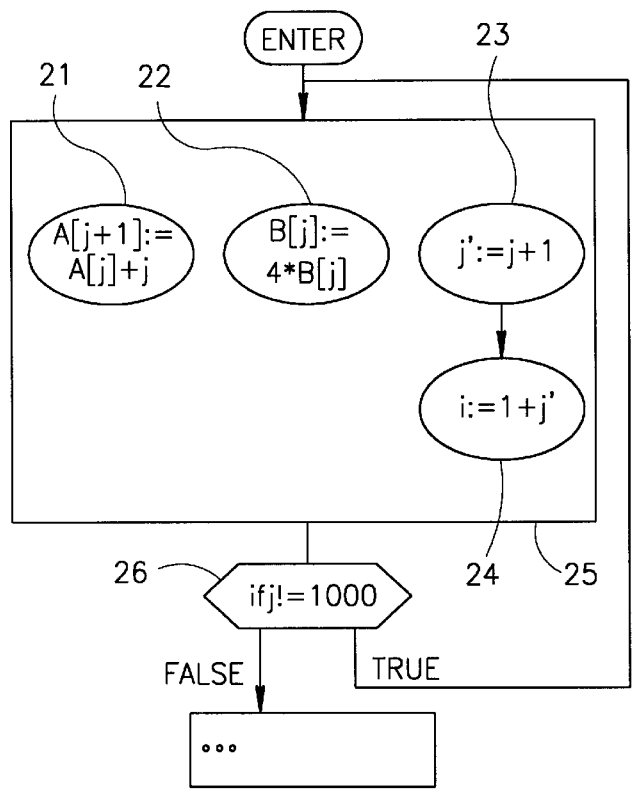

FIG. 4A extends the control flow graph by illustrating a combined control and data flow graph that corresponds to the program above. All the instructions that the processor can execute in parallel are put in the same level, so that one can observe the amount of parallelism (ILP) available within the basic block. As shown, the independent instructions A[j+1]:=A[j]+j (21), B[j]:=4*B[j] (22) are executed concurrently. The instruction j:=j+1 affects the value of j which constitutes a source operand in instructions 21 and 22, and accordingly, can not be executed parallel. If a special mechanism known "register renaming" is applied (as was explained in detail above), it can resolve this conflict and accordingly, as FIG. 4B indicates, the destination of this instruction is renamed to j' 23 which is now distinguished from the source operands of instructions 21 and 22 and accordingly and as illustrated in FIG. 4B, instruction 23 can be executed parallel to instructions 21 and 22. Hence, the amount of parallelism available increases. In contrast, the instructions j:=j+1 and i=1+j(j'=j+1 (23) and i=1+j' (24) after register renaming), constitute true data dependency (or read-after-write conflict) and accordingly they are executed serially. The set of instructions 21–24 constitute one iteration of the loop, instruction (26) is executed only when the condition in the control instruction (25) is not met. Note that when the next iteration starts, the system consider the value of j' as the index j to the A array.

Figure 5A:
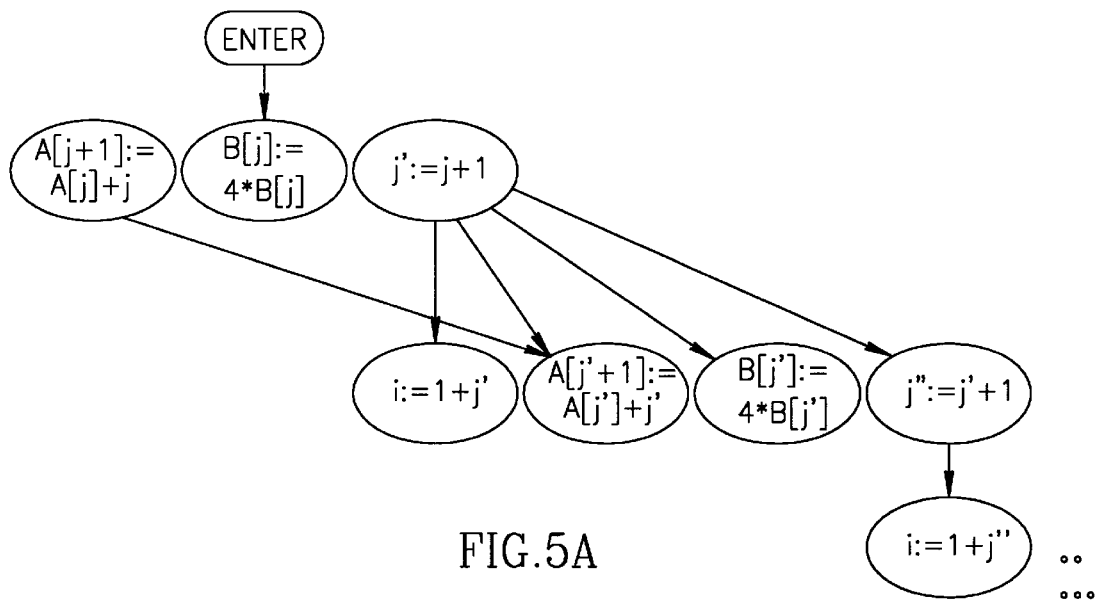
FIGS. 5A–B are two graphs with the control path, resolved in advance, according to the prior art.

If the control paths were known in advance, one could represent the execution of the program by its data flow graph as illustrated in FIG. 5A. The superscript index of the symbolic variables denotes renamed values of the corresponding variable. The traditional branch predictor attempts to achieve run-time-execution-graph as close as possible to the data flow graph in FIG. 5A by predicting the control path. When the predictor fails to predict the correct path, it needs to flush (nullify) the instructions that belong to the mis-predicted path and restart the execution flow of the correct path. Notice that there are two major benefits of branch prediction, first it can efficiently fill the empty pipeline slots following branch instruction, and in addition it increases the amount of parallelism by enlarging the amount of available candidates instructions to be executed.

Figure 5B:
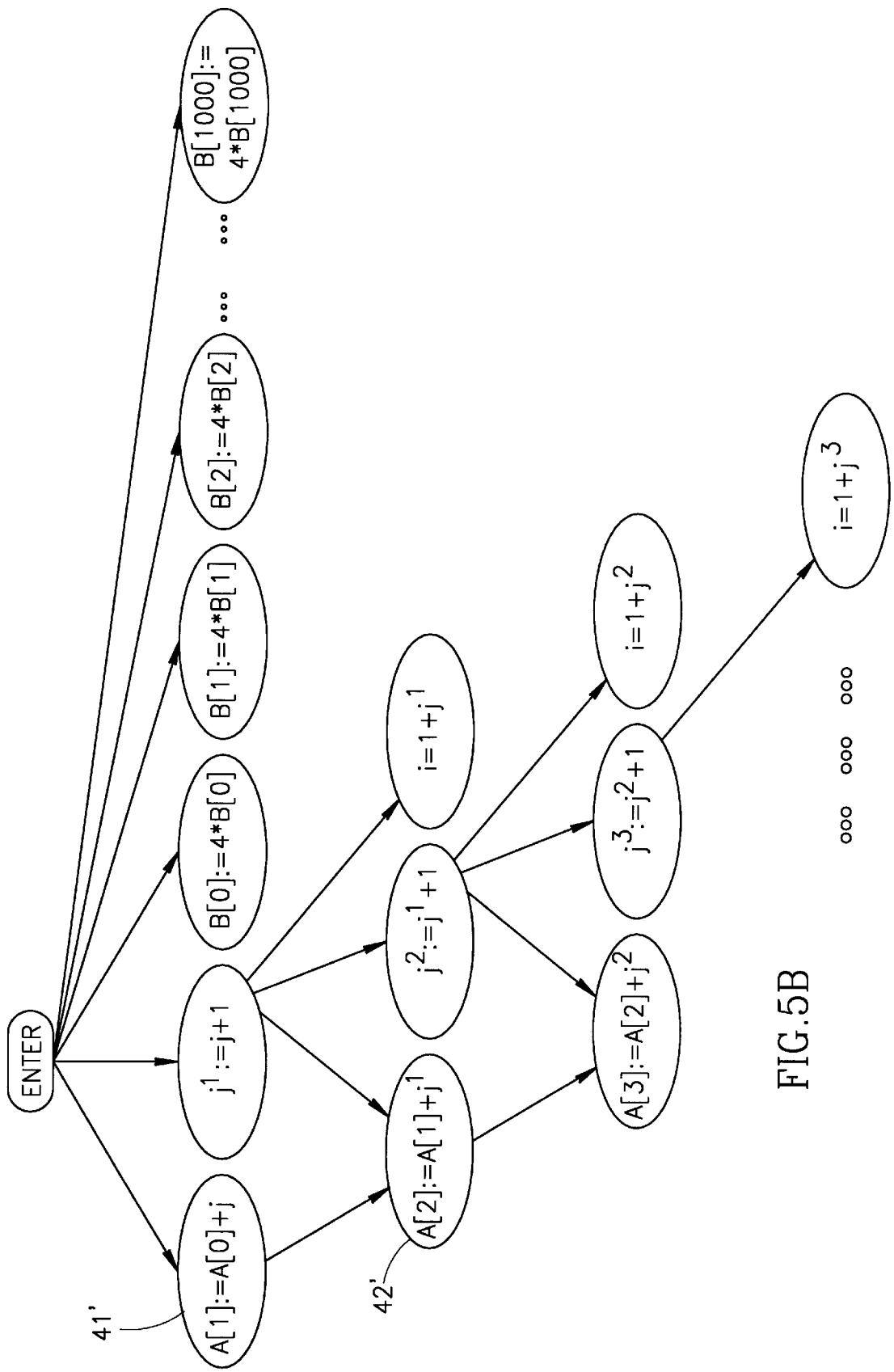

As indicated in FIG. 5A, the need to calculate the indexes for the A and B arrays introduces as additional data dependencies. Some compiler techniques were suggested to avoid such index calculations for example when the size of the array is known in advance. FIG. 5B presents the data flow graph of the example above, when the index computation is eliminated. Note that in this case all the calculations on array B can be performed in parallel, while the calculations on array A still have to be performed serially due to true data dependencies.

FIGS. 4A–B, 5A–B referred to above, exemplify various hitherto known techniques for enhancing ILP in executing the computer program segment of FIG. 3.

Figure 6:
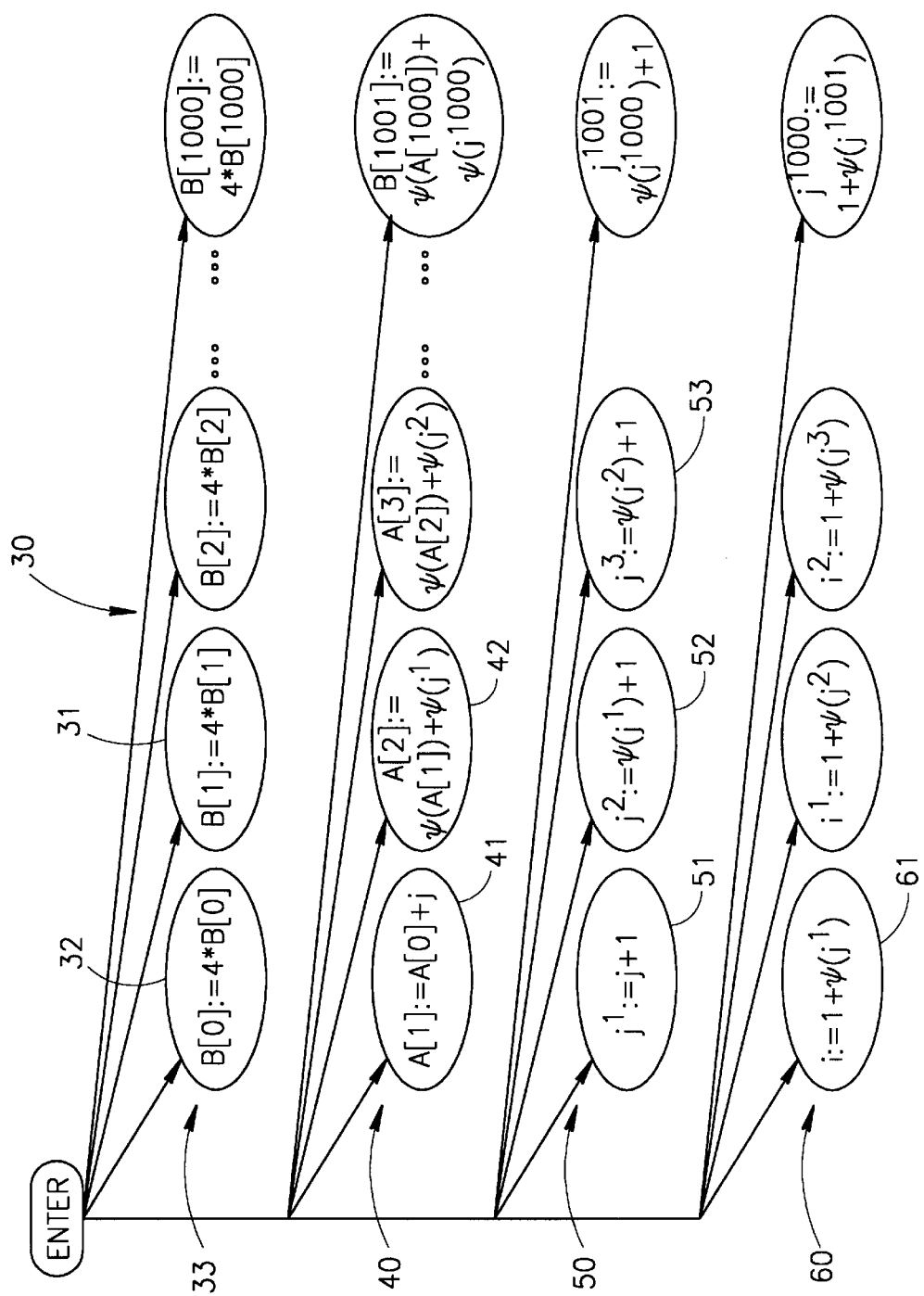
FIG. 6 is the graph of FIG. 5, further taking into account speculative data flow, according to the invention.

Attention is now directed to FIG. 6 which exhibits an additional improvement of ILP that is accomplished by introducing prediction capabilities according to the invention.

The proposed system and method of the invention, aims at proceeding beyond the control flow prediction to exploit parallelism. It attempts to predict the unavailable inputs of instructions when true dependencies (read-after-write) exists, As a result, the data flow graph can be expanded to the speculative data flow graph as illustrated in FIG. 6 (notice that the operator $\psi()$ denotes a predicted value of the corresponding symbolic variable). Notice also that the amount of parallelism (ILP) that can be accomplished by the speculative data flow (FIG. 8) graph can be greater than the data flow graphs represented by FIG. 5B. In this particular example, (whilst depicted for convenience in four distinct sections 11, 40, 50 and 60) all the operation presented in the speculative data flow graph can be executed in parallel.

More specifically, when referring to graph 30, it is readily observes that consecutive instances of instruction 22 (FIG. 4B) can be executed simultaneously since they are completely independent (e.g. the calculation of B[1] (31) is not dependent upon the calculation of the preceding instance B[0] (32). The extent of parallelism (ILP) is only bounded by the number of free execution units (if we assume that the index calculation can be eliminated). In other words, in this situation, an ideal architecture that employs unlimited execution units, the calculation of the entire array B (B[0] to B[1000]) can be accomplished within a single step. The excellent ILP for calculating the B array has, of course, nothing to do with the present invention and indeed the same extent of parallelism is exhibited in FIG. 5B. In contrast, the improvement of the invention is clearly depicted in sections 40, 50 and 60.

Turning, at the onset, to section 40, it is readily seen that the consecutive instances of array A, e.g. A[1] (41) and A[2] (42) constitute a true data dependency or read-after-write conflict (and accordingly they, i.e. 41' and 42' respectively, are executed serially as illustrated in FIG. 5B of the prior art).

The read-after-write conflict stems from the fact that the destination of instance 41 (A[1]), i.e. write instruction, is also the source operand of instance 42 (A[1]), i.e. read instruction. In order to accomplish parallelism between instances 41 and 42 despite the true data dependency, the input operand A[1] of instance 42 is subjected to prediction phase as exhibited by the nomenclature ψ(A[j]), before the value A[1] is actually produced by the execution unit that calculates instance 41. It will be required, of course, at a later stage, to verify that the prediction is indeed correct. The value of $j^1$ in instance 42 is also predicted ψ($j^1$) since it determined only later (51).

As shown in FIG. 6, the prediction operator, ψ, is applied whenever necessary and together with the hitherto known register renaming techniques the entire computer program segment can be executed in a single step, assuming ideal architecture which employs unlimited number of Eus and a perfect predictor, thereby constituting a significant improvement over the data flow of FIG. 5B which albeit employing the most advanced hitherto known ILP techniques necessitates 1000 steps of operation.

In a real life scenario, where only few execution units are available, say e.g. 10, the computer program segment of FIG. 3 will require about 100 steps in a processor of the invention as opposed to 1000 in a processor according to the prior art.

The quality of the proposed solution depends on the capability to accurately predict the unknown values. Various predictor schemes for realizing the ψ() operator can be applied to predict the output values. Several non-limiting examples of such predictors are presented below:

Before moving on to describe a structure of a predictor, it should be noted, incidentally, that if desired, an additional level of parallelism may be utilized by reapplying the prediction operator ψ (multi prediction). Thus, as shown in FIG. 6, when the first instance of the instruction j=j+1 is executed, i.e. ($j^1$=j+1) a second instance thereof is also executed in parallel (i.e. instance 52) by applying the prediction criterion ψ($j^1$). ψ($j^1$) is calculated as "previous value" (having the value (j))+stride (having the value (1)).

If, for sake of the example, the third instance $j^3=j^2+1$ is encountered by the predictor before the first instance $j^1$ has been verified, this may be implemented by applying the formula:

"previous value"+2*stride, i.e. j+2*1.

In other words the general rule that may be employed is; assuming that a given instruction has been committed, (i.e. the value thereof is set to be the "previous value") the following $n^{th}$ non-verified appearance of this instruction receives a predicted value of "previous value"+n*stride. A realization of a typical yet not exclusive multi-prediction embodiment will be described below.

Figure 7:
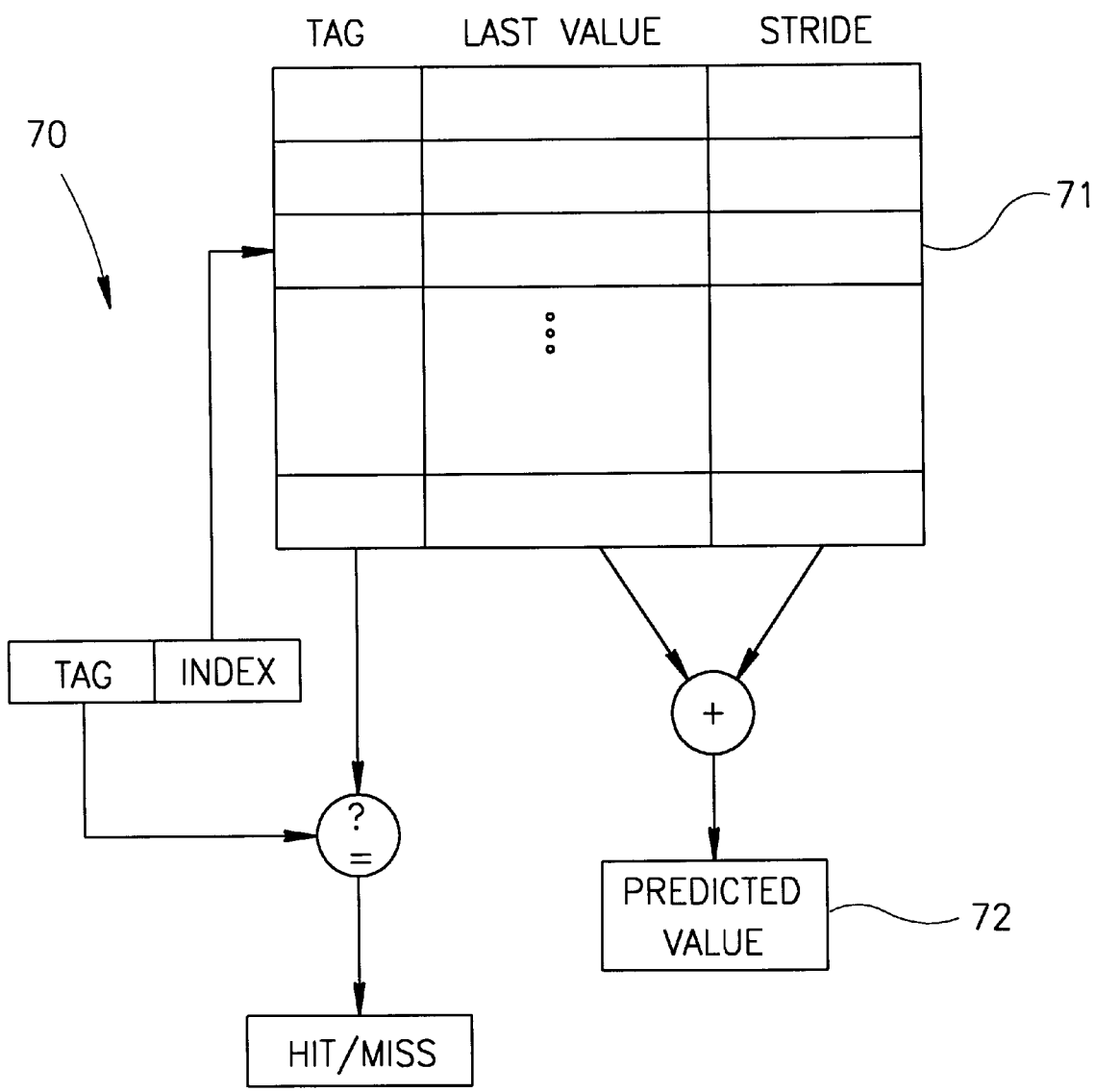
FIG. 7 is a schematic illustration of an integer stride-based predictor, according to one embodiment of the invention.

Reverting now to exemplary predictor realization, attention is directed to FIG. 7 which illustrates a typical, yet not exclusive, predictor 70 for predicting integer data types. The gathered information of the predictor is organized as a hash table 71. Each entry includes 3 fields:

TAG—keeps the high order bits of the address of the predicted instruction. It is used for locating the required prediction within the table.

Last valve—is the most recent committed value (committed previous value) generated by the corresponding instruction.

Stride—is the corresponding stride value.

In operation, the high order bits of the address of the instruction is first compared against the TAG field. In the case of discrepancy, the predictor may allocate a new entry for the corresponding instruction (New entry allocation is discussed below). If, on the other hand, the TAG matches an address, the predicted value is set to be Last value+stride (72). When the output value is truly resolved, (i.e. upon actual execution of the instruction), the prediction table is update respectively: (1) stride=true value–last value; 2) last value=true value. By this particular embodiment, the latter stage along with the "verify" step discussed above constitutes the specified "commit" step.

When the instruction that is currently subjected to prediction does not reside in the prediction table, no prediction can be provided by the predictor. If the instruction does not cause a true data dependency, or if the probability for accurate prediction is not significant, it is useless to allocate an entry in the prediction table. Otherwise, an entry is allocated, and the TAG field is updated respectively (e.g. according to a known per se hashing technique). The "last value" field is set according to the output that is generated by the instruction and the initial stride value is set by default to 0. The predicted value is not necessarily determined on the basis of one previous value and, accordingly, a more complex predictor may be realized which is fed with more than one previous value (if available) of the instruction that is currently subjected to prediction. The same holds true with respect to the stride, i.e. more than one previous stride may be fed to the predictor. Obviously, in the latter embodiment, the predicted value is not computed as a simple add operation, but rather a more complicated function is calculated, that depends upon the input previous value(s) and stride(s).

Figure 8:
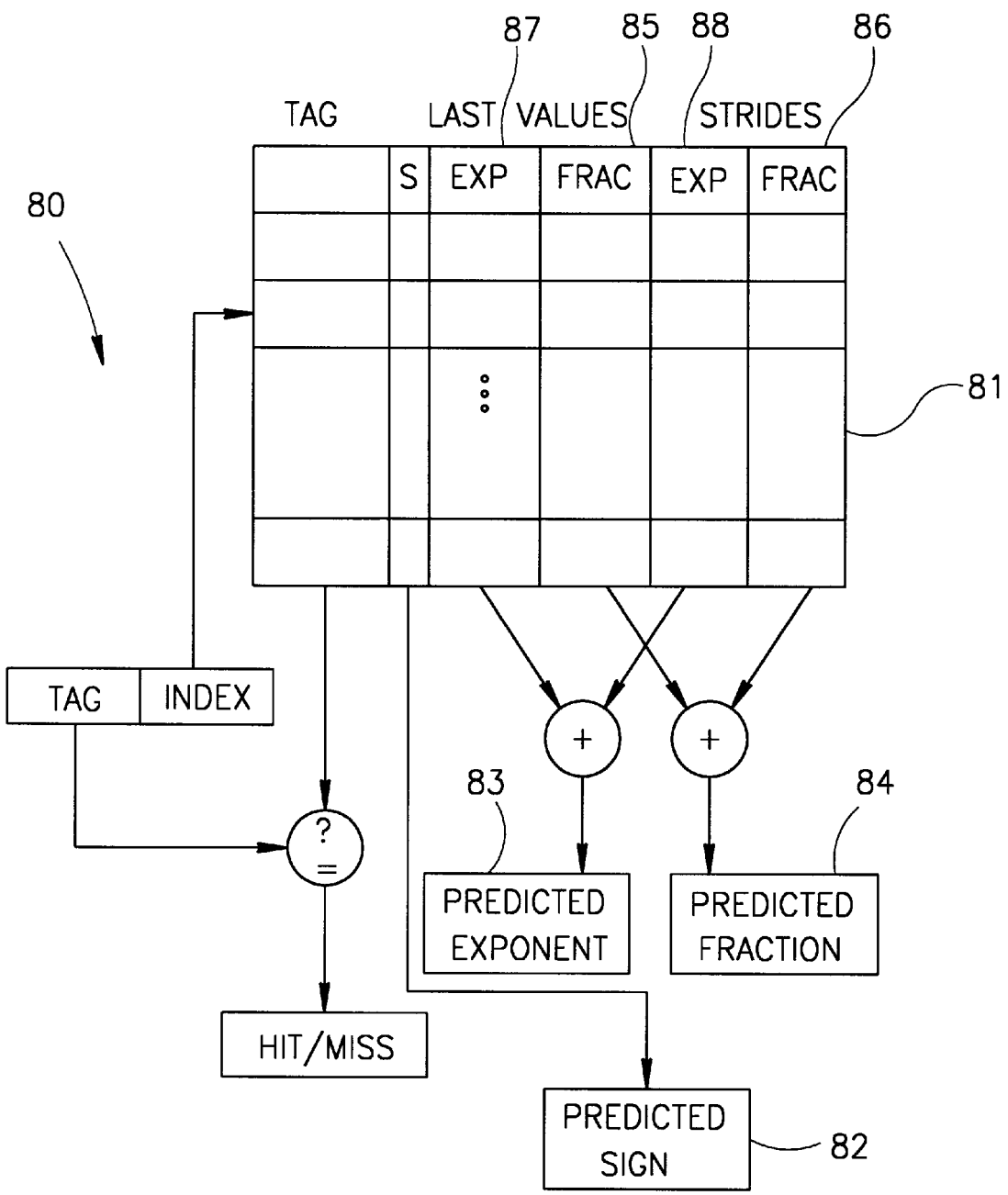
FIG. 8 is a schematic illustration of a floating point multiple-stride based predictor, according to another embodiment of the invention.

FIG. 8 illustrates a typical, yet not exclusive, predictor (80) for predicting floating-point data types. The prediction table (81) is arranged similarly to the integer stride-based predictor. However, unlike the integer predictor which provides a single predicted value for each instruction, this predictor provides 3 predicted fields for each floating-point instruction: sign (82), exponent (83) and fraction (84), respectively.

A floating-point data format is determined according to these 3 fields. For example according to the known ANSI/IEEE 754 Floating-point Standard the floating-point data value equals:

$$\text{Data value} = \begin{cases} 1.frac \times 2^{exponent-constant} & sign = 0 \\ -1.frac \times 2^{exponent-constant} & sign = 1 \end{cases}$$

Hence, the prediction value for each field is determined as follows:

Sign—is determined according to the last sign value.
Fraction—is determined according to the sum of the last fraction value (85) and the fraction stride (86).
Exponent—is determined according to the sum of last exponent value (87) and the exponent stride (88).

Figure 9:
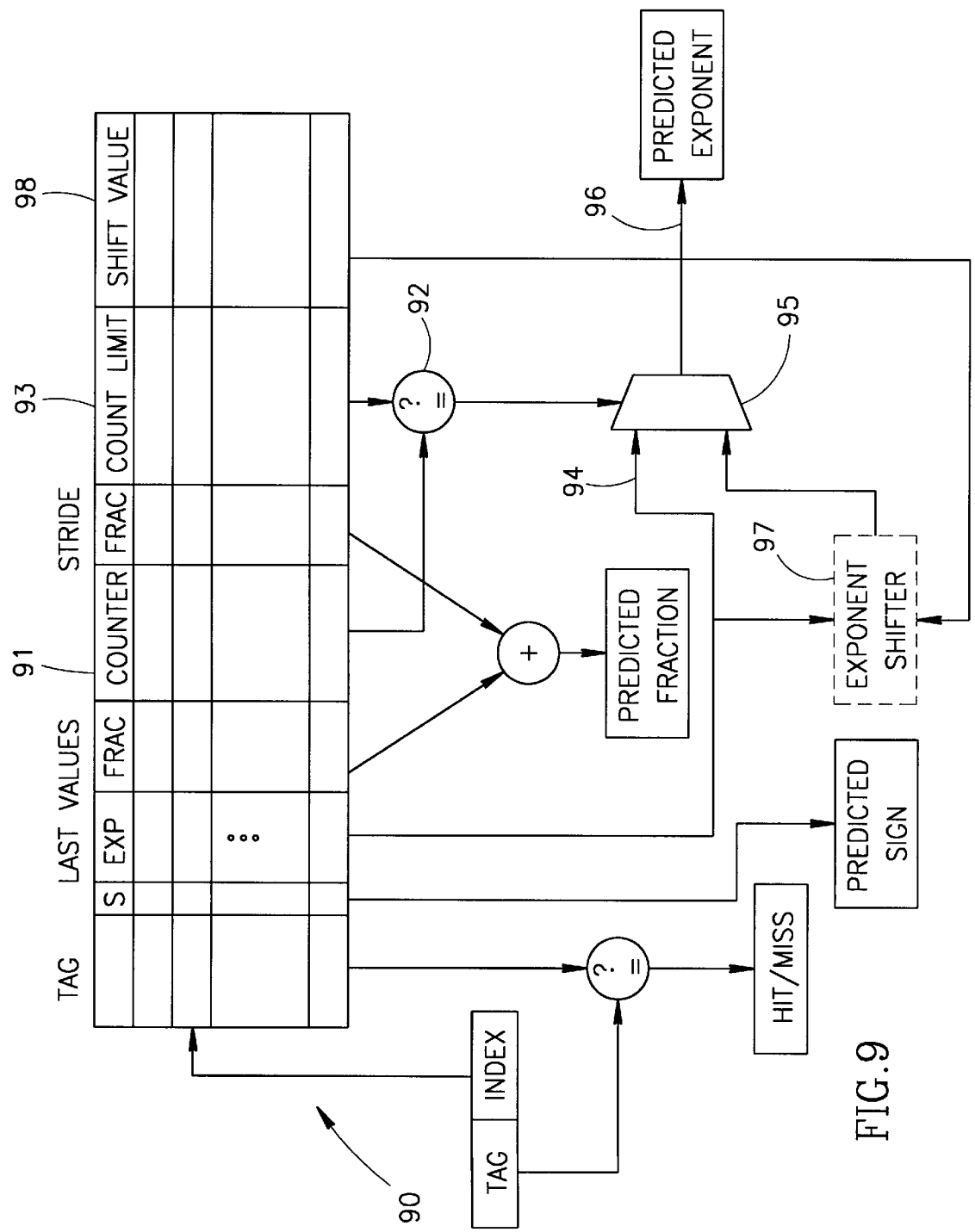
FIG. 9 is a schematic illustration of a floating point multiple-stride based predictor, according to yet another embodiment of the invention.

FIG. 9 illustrates another embodiment of a predictor 90 for predicting floating point data types. In distinction from the predictor of FIG. 8, this predictor predicts the exponent field in a different manner. Thus, predictor 90 employs a counter (91) for each entry. The counter is incremented each time the predictor is accessed, and it is compared (92) each time against the count limit field (93). As long as the counter value does not reach the value of count limit, the predicted exponent value is the exp field i.e. entry 94 is routed to the output 96 of logic 95. If, on the contrary, the counter value equals the count limit, the exp field (entry 94) is shifted left or right n bits (in shifter 97) according to the shift value field 98, and the counter is reset.

Those versed in the art will readily understand that the predictors of FIGS. 7 to 9 are only three out of many possible realization of predictors that are adapted to realize the specified ψ() operator, based on at least one previous value and at least one stride value (and possibly on other parameters). It should be noted that the integer predictor that is suitable for predicting values based on solely at least one previous value, resembles to a large extent the one depicted in FIG. 7, except for the fact that the stride column at table 71 is removed and the "add" operator is not required. the same alterations apply to the floating point predictor of FIGS. 8 and 9 mutatis mutandis.

It should be further noted that the system and method of the invention is not necessarily limited to the specified serial and or parallel verification process, and, accordingly, other verification procedures may be employed e.g. combined serial and parallel verification.

It should be noted, incidentally, that several processor architectures may fetch multiple instruction simultaneously and as a result the predictor may need to provide multiple predicted values for an individual instruction.

Figure 10:
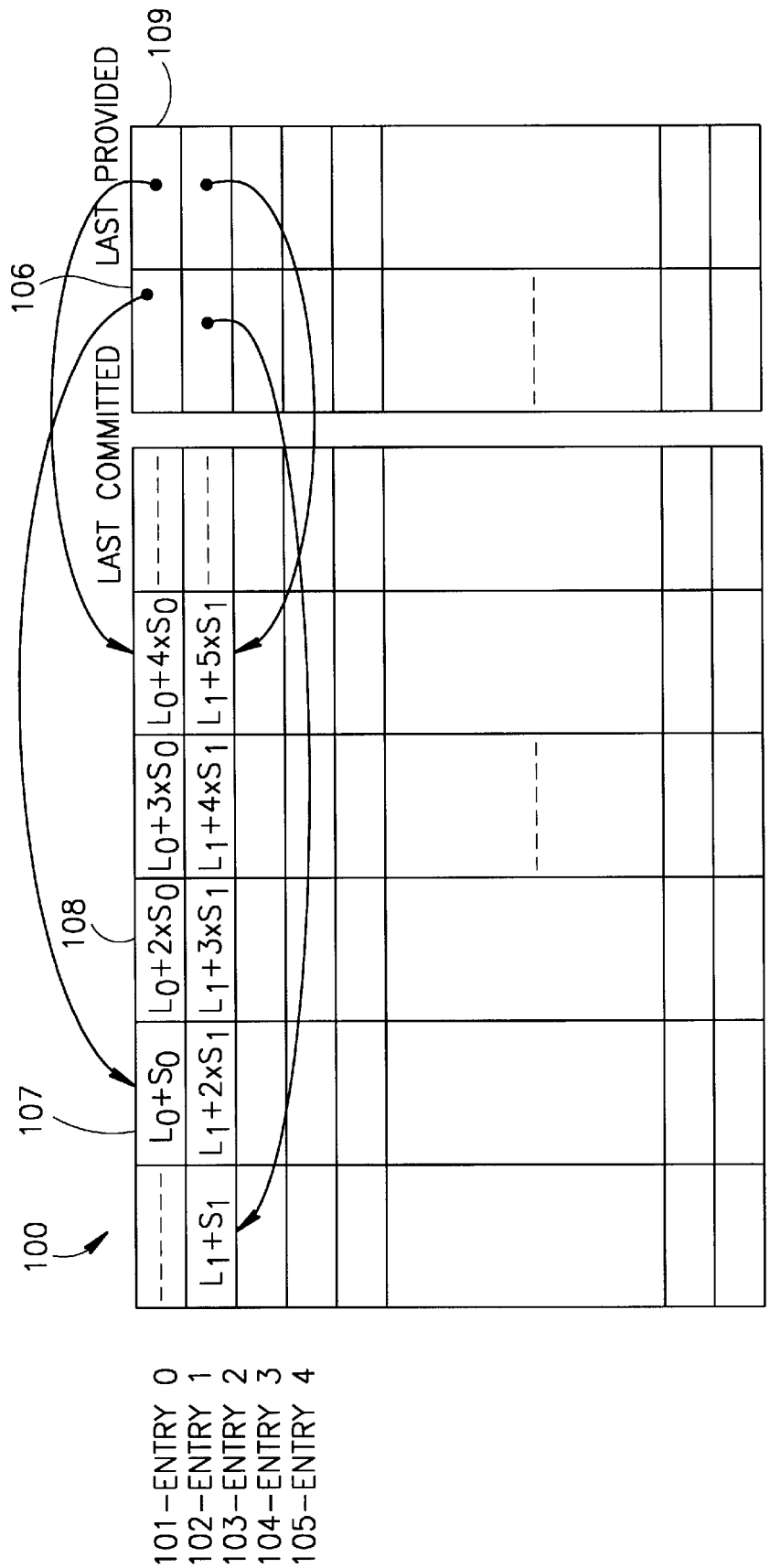
FIG. 10 is a schematic illustration of a multi-prediction based predictor according to one embodiment of the invention.

FIG. 10 presents one possible implementation of such predictor. In this example, the predictor employs a table 100, where each entry in the table is associated with an individual instruction (101–105). For each entry, an cyclic array of predicted values is associated. The first item in this array, (pointed by the "last committed value" field 106) contains the base+stride value (107), the next item contains the base +2*stride 108 and so on. The "last provided" 109 field points to the last predicted value that was provided by predictor. At any point, up to M concurrent requests can be handled by the predictor. The predictor orders these request in an arbitrary order (a priority encoder (not shown) can be used for this purpose), and retrieves the item "last provided"+1 to the first one, "last provided"+2 to the second one and so on. In this example a known per se special circuit (not shown) is assumed to calculate new items in this table. The "last provided" pointer should be updated to the right position (note that if for some reasons there are less available items then requested, some copies of the individual instruction will get the requested predicted values while the others will get an indication that the prediction is not possible).

As the instruction(s) using that predicted value are committed, the "last committed value" field is updated, leaving space for new predicted items to be entered. As soon as the stride is changed, the entire entry should be discarded.

The implementation of the system and method of the invention as part of future processor can be dependent on some other technologies that will be used to improve the processor's performance. In this section, the following elements are discussed: A) committing the speculative instructions, B) the capability of producing multiple prediction decisions and C) Putting all together: Speculative data prediction and pipelining.

A. Committing the speculative instruction:

Since a realistic predictor can not be 100% accurate, the predicted inputs must be verified in order to commit the execution of the speculative calculation. The verification of the predicted input values can be implemented e.g. according to the following techniques:

1. Serial verification: The verification of the predicted inputs is made in serial, i.e. at each verification stage, the predicted value is compared against the "real" value. At comparison stage, if the comparison fails, the calculation is repeated, this time operating on the true-inputs, which obviously necessitates additional computational cycles; otherwise the result is committed.

Figure 11A:
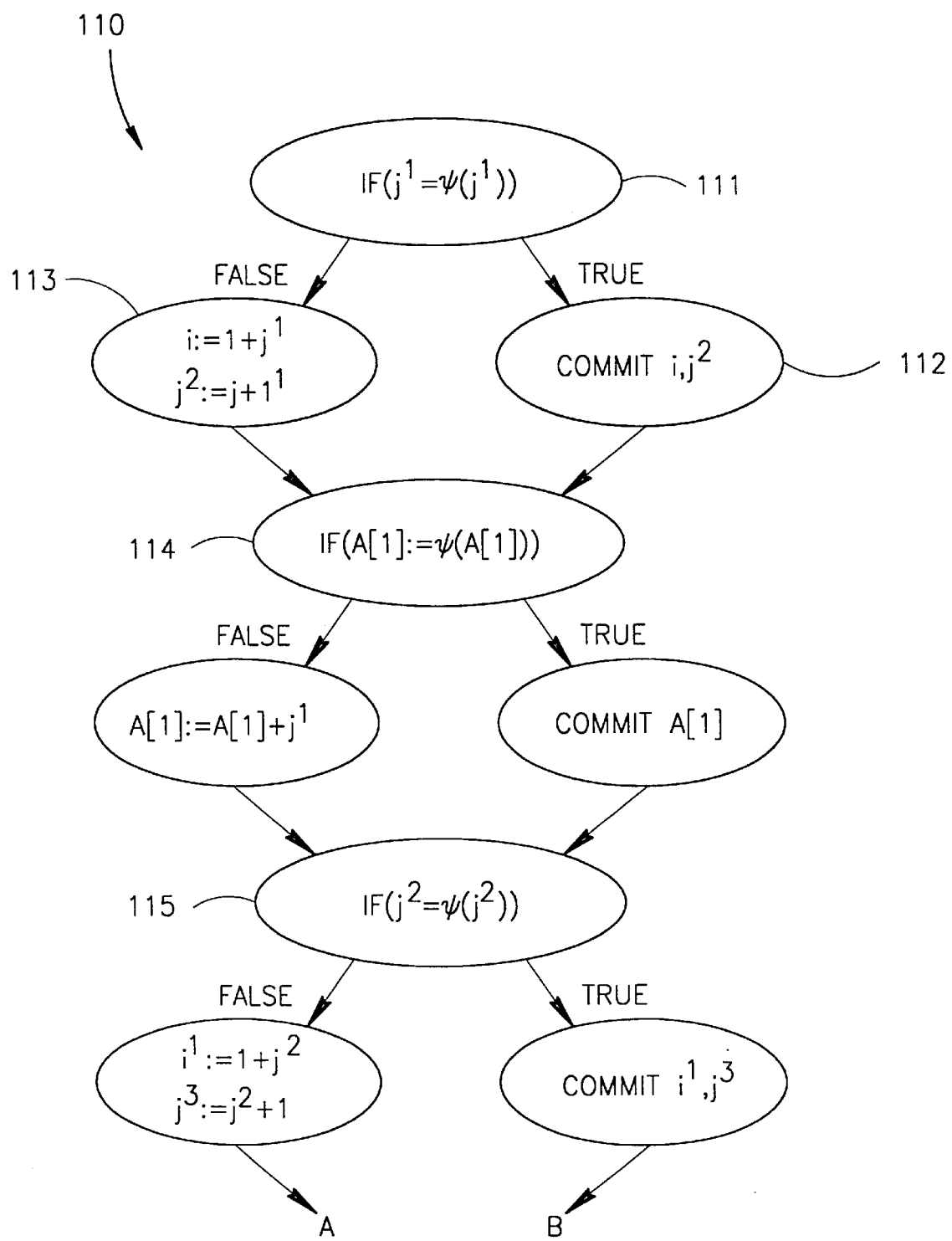
FIG. 11 is a flow chart exemplifying a serial verification sequence according to one embodiment of the invention.
Figure 11B:
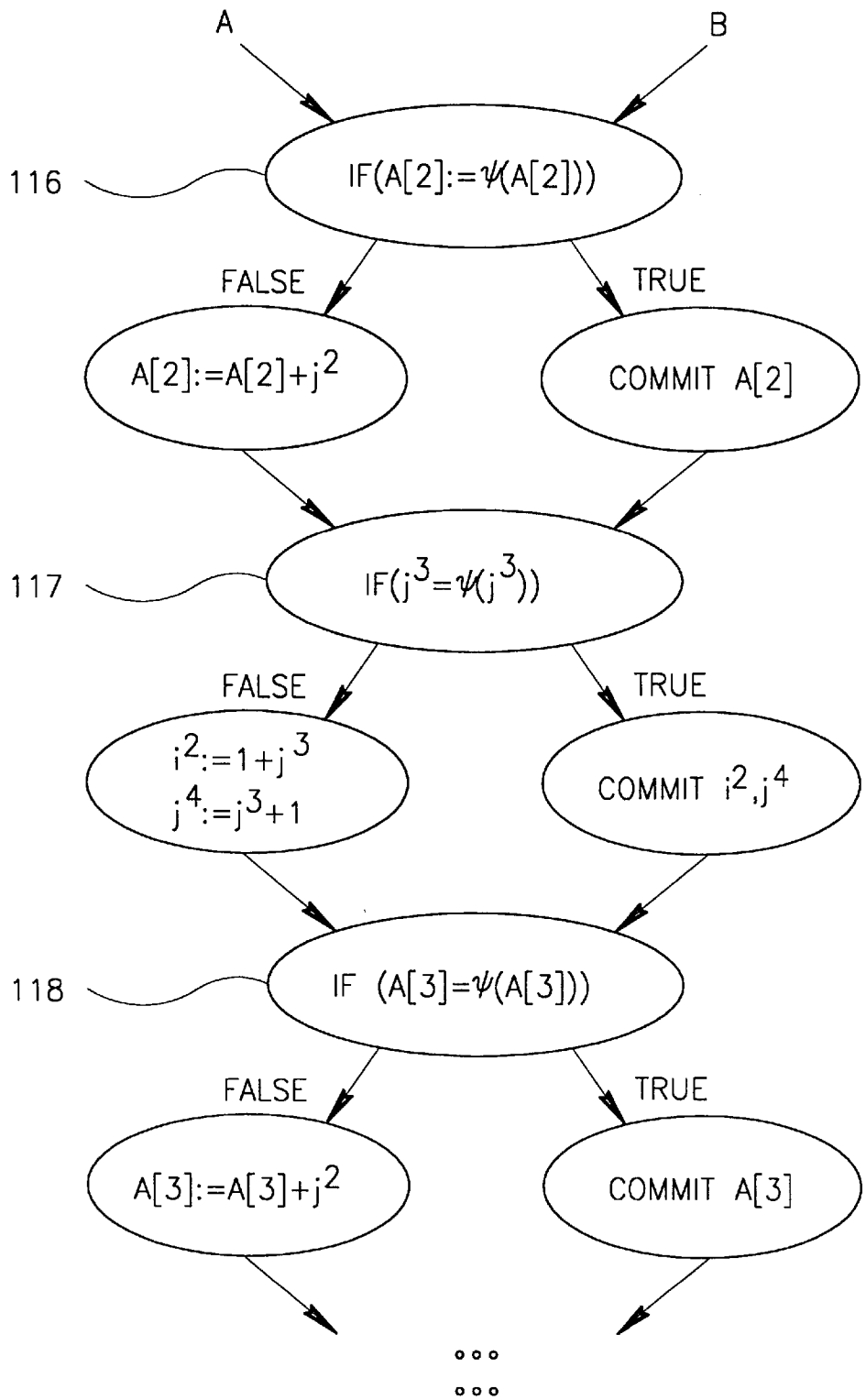

FIG. 11 illustrates a typical serial verification procedure 110, which is based on existing commit mechanisms. Thus, in step 111 it is required to verify whether $j^1$ matches the predicted value thereof $\psi(j^1)$. If in the affirmative, then all the instructions that are depended on the predicted value of $j^1$ are verified. The graph of FIG. 6 readily reveals that instructions 52 ($j^2=\psi(j^1)+1;$) and 61 ($i=1+\psi(j^1)$) depend solely on the predicted value of $\psi(j^1)$, and, therefore, they are verified as is evident from stage 112 in FIG. 11. Instruction 42, on the contrary, whilst depending on $\psi(j^1)$, is contingent also upon $\psi(A[1])$, which has not been confirmed as yet (i.e. it has not yet been determined whether $\psi(A[1])=$ A[1+j]), and accordingly, instruction 42 cannot be confirmed. To sum up, stage 112 shows that instructions that generate i and $j^2$ (61 and 52, respectively) are verified. This means that their respective entry in the reorder buffer 12 of FIG. 2 is committed.

If, on the other hand, $j^1$ does not match the predicted value thereof $\psi(j^1)$, instructions 52 and 61 are discarded (in the reorder buffer 12) and have to re-routed for execution. The latter step is shown in stage 103. FIG. 11 shows similar serial verification procedure with respect to A[1], $j^2$, A[2], $j^3$ and A[3] (stages 114–118, respectively). Albeit not shown, in the case that there exists other speculative instructions that followed the miss-predicted read instruction they are of course also discarded.

The main drawback of the serial verification is that it adversely affects the accomplished parallelism. Thus, even if high level ILP is obtained until the verification phase, the overall performance will be derogated by virtue of the serial and possibly relatively slow verification process. In order to cope with this drawback a parallel verification scheme is proposed.

Figure 12:
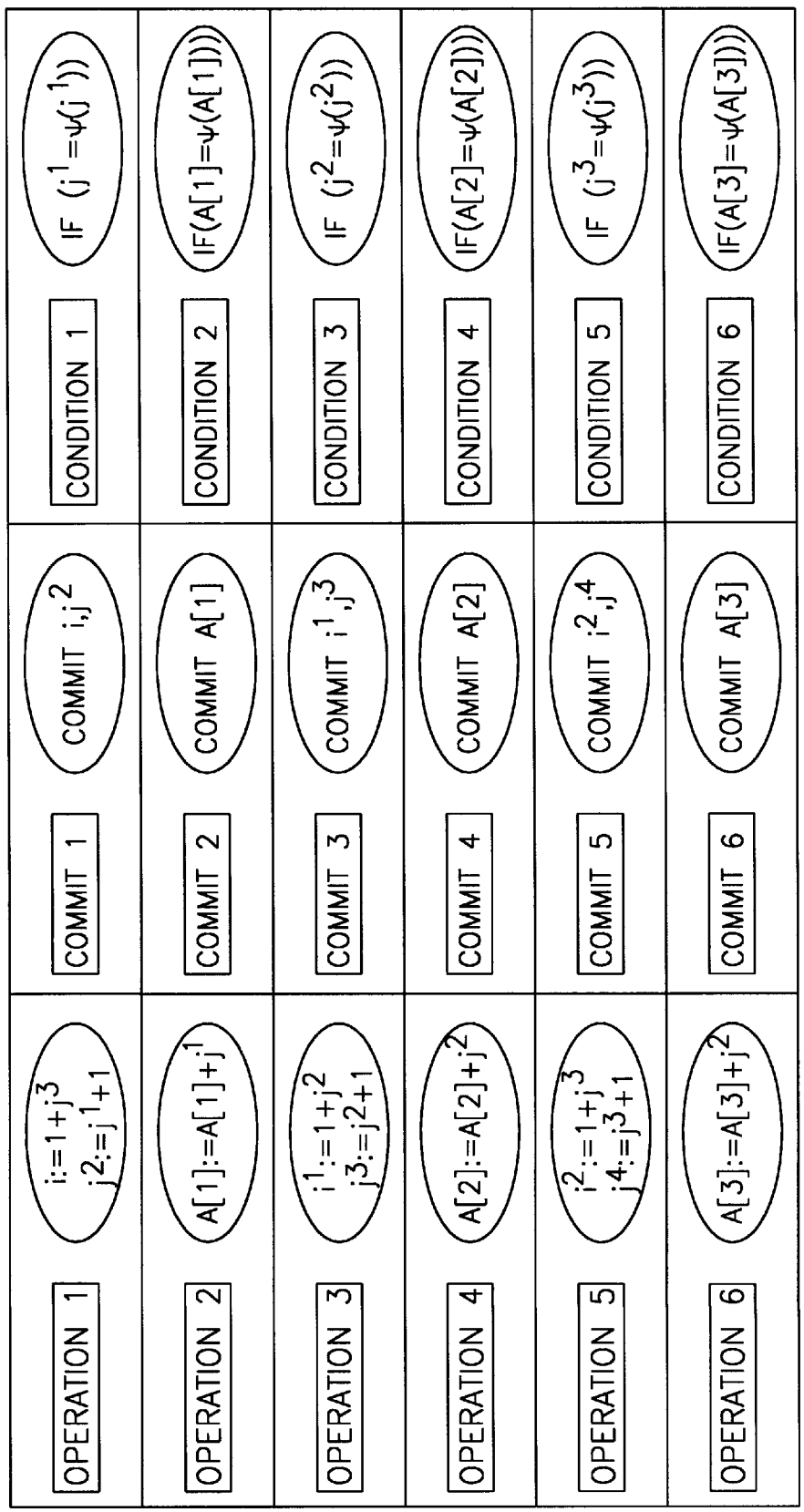
FIG. 12 is a table exemplifying a parallel verification sequence according to another embodiment of the invention.

2. Parallel verification: This technique attempts to commit the speculative computations in parallel as it is illustrated in FIG. 12 and the following C exemplary program. First, all conditions are examined in parallel and if all of these condition are satisfied than all the output values are committed. Otherwise, the operation(s) that utilized those miss-predicted values need to be repeated.

For a better understanding of the parallel verification process, consider the following exemplary computer program segment:

```
k: = 1
Do{
        if(condition(k)∩condition(k + 1) ∩...condition(1000)) then
        {    commit(k) commit(k + 1) ... commit(1000)
              k: = 1000 )
        else
        {k: = first()*
        operation(k)
        k: = k + 1}
}while(k < 1000)
end
```

*first()—returns the number of the first condition that has caused the failure from condition(k) to condition(2000).

The procedure of parallel verification will be explained with reference to the above exemplary algorithm and FIG. 12. Thus, as shown, a parallel verification step is carried out by testing simultaneously conditions (condition (k) to condition (1000)) where k is initially set to 1. Each "condition (i)" statement stands for "if i (value generating instruction)= value generating instruction", e.g. with reference to FIG. 12 if $(j^1 = \psi(j^1)$. Obviously in order to accomplish simultaneous check of n conditions, n comparator units are employed simultaneously. If all the conditions are met (i.e. all the predicted values match their corresponding actual values) then the respective instructions are verified and the verification process terminates. In the case of discrepancy, i.e. a given condition is not met then control is transferred to the "else" clause. In this connection, it should be noted that the above exemplary parallel verification process assumes C language convention, i.e. the conditions are evaluated in the "if" statement from left to right and the first condition that is not met causes to abort the if statement. As shown in the "else" clause, k is set to hold the value of the first condition that failed. Next, the instruction that is subject to the failure is re-executed (i.e. "operation (k)") and the parallel verification loop proceed from condition k+1 and onwards.

Those versed in the art will readily understand that the proposed approach of parallel verification as exhibited in FIG. 13 and the pertinent exemplary computer program is only one out of many possible options for realizing parallel verification. The commit stage include as specified above the verification stage as well as the remaining required steps, e.g. updating the predictor (in the case of affirmative validation) handling the branch predictor and register remaining activities and possibly others all as required and appropriate.

An appropriate attention should be given to the technique of attaching the predictor to the processor's pipeline. A major issue that should be discussed is whether the predictor can provide the predicted values when they are needed to the processor or, in other words, what are the implications of the prediction time?

In order to predict certain values, the predictor table should be accessed and the speculative value may need to be calculated. This entire procedure may require a certain time slice to be completed.

Fortunately, the issue of providing predicted value on time is inherently resolved since the predicted values are not needed as soon as the instructions enter the pipeline but rather only in further stages. For example, in FIG. 1 it can be observed that the instructions enter the pipeline in "fetch" stage but their actual operands are needing as the instructions enter the "execution" stage. The time gap allows the predictor the sufficient time to satisfy the predicted values.

The present invention has been described with a certain degree of particularity but it should be understood that various modifications and alteration may be made without departing from the scope or spirit of the invention as defined by the following claims:

We claim:

1. A processor and associated memory device comprising a fetcher for fetching instructions stored in said memory device; each instruction constitutes either a value generating instruction or a non-value generating instruction; each one of said value generating instructions having at least one destination for storing said value;

the processor further comprising a decoder for decoding said instructions, an issue unit for routing decoded instructions to at least one execution unit;

the processor is characterized in farther having a predictor being responsive to a first set of instructions, from among said value generating instructions, for predicting, with respect to each one instruction in said first set of instructions, a predicted value that is determined on the basis of a prediction criterion which includes: (i) at least one previous value generated by said one instruction; and (ii) at least one stride;

said issue unit being further capable of detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

said issue unit is capable of assigning the predicted value of said write instruction to the at least one operand of said read instructions thereby rendering the latter speculative instructions, and is further capable of routing said write and at least one of said read instructions to distinct execution units, from among said at least two execution units, so as to accomplish parallel processing; and commit unit for committing at least said speculative instructions.

2. The processor according to claim 1, wherein said committing include either verifying said predicted value and updating said predictor, or refuting said predicted value by discarding said at least one read instructions.

3. The processor according to claim 1, wherein said first set of instructions being the entire set of value generating instructions.

4. The processor according to claim 1, wherein said first set of instructions including the integer instructions from among the value generating instructions.

5. The processor according to claim 1, wherein said first set of instructions including the floating-point instructions from among the value generating instructions.

6. The processor according to claim 1, further employing branch predictor for predicting the outcome of branch instructions.

7. The processor according to claim 1, wherein said issue unit is further capable of detecting and resolving write-after-read conflicting instructions.

8. The processor according to claim 1, wherein said issue unit is further capable of detecting and resolving write-after-write conflicting instructions.

9. The processor according to claim 1, wherein the prediction criterion, with respect to at least one integer instruction from among said value generating instructions, includes one last value and one stride and said predicted value is determined to be the sum of said last value and said stride.

10. The processor according to claim 1, wherein the prediction criterion, with respect to at least one floating point instruction from among said value generating instructions, includes one last value and one stride; said last value is represented as last sign, last fraction and last exponent and said stride is represented as stride fraction and stride exponent; said predicted value is represented as predicted sign, predicted fraction and predicted exponent; said predicted sign is determined to be said previous sign, said predicted fraction is determined to be the sum of said last fraction and stride fraction, and said predicted exponent is determined to be the sum of said last exponent and stride exponent.

11. The processor according to claim 1, wherein the prediction criterion, with respect to at least one integer instruction from among said value generating instructions, includes one last committed value and one stride;

said one integer instruction being an $i^{th}$ non-committed occurrence of said instruction that followed a committed occurrence thereof; said predicted value is determined to be the sum of said last committed value and the product of i and said stride.

12. The processor according to claim 11, wherein said product is retrieved from an a priori available data.

13. The processor according to claim 1, wherein the prediction criterion, with respect to at least one integer instruction from among said value generating instructions, includes one last value.

14. A processor and associated memory device comprising a fetcher for fetching instructions stored in said memory device; each instruction constitutes either a value generating instruction or a non-value generating instruction; each one of said value generating instructions having at least one destination for storing said value; said value generating instructions include calculating instructions;

the processor further comprising a decoder for decoding said instructions, an issue unit for routing decoded instructions to at least one execution unit;

the processor is characterized in further having a predictor being responsive to a first set of instructions, from among said calculating instructions, for predicting, with respect to each one instruction in said first set of instructions, a predicted value that is determined on the basis of a prediction criterion which includes: (i) at least one previous value generated by said one instruction;

said issue unit being further capable of detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

said issue unit is capable of assigning the predicted value of said write instruction to the at least one operand of said read instructions thereby rendering the latter speculative instructions, and is further capable of routing said write and at least one of said read instructions to distinct execution units, from among said at least two execution units, so as to accomplish parallel processing; and commit unit for committing at least said speculative instructions.

15. The processor according to claim 14, wherein said committing include either verifying said predicted value, or refuting said predicted value by discarding said at least one read instructions and updating said predictor.

16. The processor according to claim 14, wherein said first set of instructions being the entire set of calculating instructions.

17. The processor according to claim 14, wherein said first set of instructions including the integer instructions from among the calculating instructions.

18. The processor according to claim 14, wherein said first set of instructions including the floating-point instructions from among the calculating instructions.

19. The processor according to claim 14, further employing branch predictor for predicting the outcome of branch instructions.

20. The processor according to claim 14, wherein said issue unit is further capable of detecting and resolving write-after-read conflicting instructions.

21. The processor according to claim 14, wherein said issue unit is further capable of detecting and resolving write-after-write conflicting instructions.

22. In a processor and associated memory device,
a method for accomplishing parallel processing, comprising:
(i) fetching instructions stored in said memory device; each instruction constitutes either a value generating instruction or a non-value generating instruction; each one of said value generating instructions having at least one destination for storing said value;
(ii) decoding said instructions;
(iii) routing decoded instructions to at least one execution unit;
(iv) predicting with respect to each one instruction in a first set of instructions, from among said value generating instructions, a predicted value that is determined on the basis of a prediction criterion which includes: (i) at least one previous value generated by said one instruction; and (ii) at least one stride;
(v) detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;
(vi) assigning the predicted value of said write instruction to the at least one operand of said read instructions thereby rendering the latter speculative instructions;
(vii) routing said write and at least one of said read instructions to distinct execution units, from among said at least two execution units, so as to accomplish parallel processing; and
(viii) committing at least said speculative instructions.

23. In a processor and associated memory device,
a method for accomplishing parallel processing, comprising:
(i) fetching instructions stored in said memory device; each instruction constitutes either a value generating instruction or a non-value generating instruction; each one of said value generating instructions having at least one destination for storing said value; said value generating instructions include calculating instructions;

(ii) decoding said instructions;

(iii) routing decoded instructions to at least one execution unit;

(iv) predicting with respect to each one instruction in a first set of instructions, from among said calculating instructions, a predicted value that is determined on the basis of a prediction criterion which includes: (i) at least one previous value generated by said one instruction;

(v) detecting a sequence of write instruction followed by at least one read instruction, the sequence constituting read-after-write conflicting instructions, such that the destination of said write instruction and at least one input operand of each one of said read instructions being the same; said write instruction belongs to a second set of instructions from among said first set of instructions and each of the at least one read instruction belongs to a third set of instructions from among said instructions;

(vi) assigning the predicted value of said write instruction to the at least one operand of said read instructions thereby rendering the latter speculative instructions;

(vii) routing said write and at least one of said read instructions to distinct execution units, from among said at least two execution units, so as to accomplish parallel processing; and (viii) committing at least said speculative instructions.

* * * * *